United States Patent
Shvaiger et al.

(10) Patent No.: US 10,545,674 B1
(45) Date of Patent: Jan. 28, 2020

(54) METHOD AND SYSTEM FOR SSD PERFORMANCE JITTER DETECTION AND AVOIDANCE

(71) Applicant: EMC IP Holding Company LLC, Hopkinton, MA (US)

(72) Inventors: Felix Shvaiger, Brighton, MA (US); Anton Kucherov, Milford, MA (US); Boaz Binia, Brighton, MA (US); Gabriel Benhanokh, Tel Aviv (IL); Arieh Don, Newton, MA (US)

(73) Assignee: EMS EP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/198,406

(22) Filed: Jun. 30, 2016

(51) Int. Cl.
*G06F 3/06* (2006.01)

(52) U.S. Cl.
CPC .......... G06F 3/061 (2013.01); G06F 3/0665 (2013.01); G06F 3/0689 (2013.01)

(58) Field of Classification Search
CPC ....... G06F 3/061; G06F 3/0665; G06F 3/0689
See application file for complete search history.

(56) References Cited

U.S. PATENT DOCUMENTS

| | | | | |
|---|---|---|---|---|
| 7,512,766 B2 * | 3/2009 | Nicholson | ............... | G06F 3/061 710/18 |
| 2002/0091746 A1 * | 7/2002 | Umberger | ............. | G06F 3/0613 718/105 |
| 2003/0212872 A1 * | 11/2003 | Patterson | ............. | G06F 3/0601 711/165 |
| 2006/0069866 A1 * | 3/2006 | Miyazaki | ............. | G06F 3/0614 711/114 |
| 2008/0256304 A1 * | 10/2008 | Kezuka | ................... | G06F 3/061 711/145 |
| 2012/0023365 A1 * | 1/2012 | Byom | .................. | G06F 11/073 714/6.13 |
| 2013/0312005 A1 * | 11/2013 | Chiu | ....................... | G06F 3/061 718/105 |
| 2014/0215129 A1 * | 7/2014 | Kuzmin | ............. | G06F 12/0246 711/103 |
| 2015/0242133 A1 * | 8/2015 | Smith | .................. | G06F 3/0613 711/114 |
| 2015/0242245 A1 * | 8/2015 | Brown | ................. | G06F 9/5033 718/105 |
| 2015/0263986 A1 * | 9/2015 | Park | ...................... | H04L 47/781 709/226 |

OTHER PUBLICATIONS

Martin Schoeberl. Scheduling of hard real-time garbage collection. May 11, 2010. Institute of Computer Engineering, Vienna University of Technology, Vienna, Austria (Year: 2010).*

* cited by examiner

*Primary Examiner* — Ryan Bertram
(74) *Attorney, Agent, or Firm* — Ryan, Mason & Lewis, LLP

(57) ABSTRACT

Example embodiments of the present invention relate to methods, systems, and a computer program product for detecting and avoiding storage array performance degradation. The method includes anticipating an unpredictable performance state of a storage device in a storage array that degrades storage array functionality according to a performance profile for a storage device type of the storage device. In response, performance of the storage array may be adjusted to avoid the storage device entering the unpredictable performance state.

21 Claims, 7 Drawing Sheets

METHOD AND SYSTEM FOR SSD PERFORMANCE JITTER DETECTION AND AVOIDANCE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to storage device jitter and, more specifically, to detecting and avoiding jitter in storage array storage devices.

BACKGROUND

The difference between hard disk drives (HDDs) and solid state disks (SSDs) derives from the very physics of magnetic media and NAND flash memory. Magnetic media can be overwritten endlessly; flash memory cannot. With an HDD, the action of "deleting" a file typically affects only the metadata in the directory, which is changed to designate the affected sectors as now containing "free space" for writing new data over the old. With NAND flash memory, by contrast, free space can only be created by actually deleting or erasing the data that previously occupied a page of memory. The process of reclaiming pages of flash memory that no longer contain valid data is called "garbage collection." Only when the pages, and the blocks they contain, have been reset in this fashion are they able to store new data during a write operation. In SSD parlance, the act of writing, then deleting data is referred to as a program/erase (P/E) cycle.

SUMMARY

Example embodiments of the present invention relate to methods, systems, and a computer program product for detecting and avoiding storage array performance degradation. The method includes anticipating an unpredictable performance state of a storage device in a storage array that degrades storage array functionality according to a performance profile for a storage device type of the storage device. In response, performance of the storage array may be adjusted to avoid the storage device entering the unpredictable performance state.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
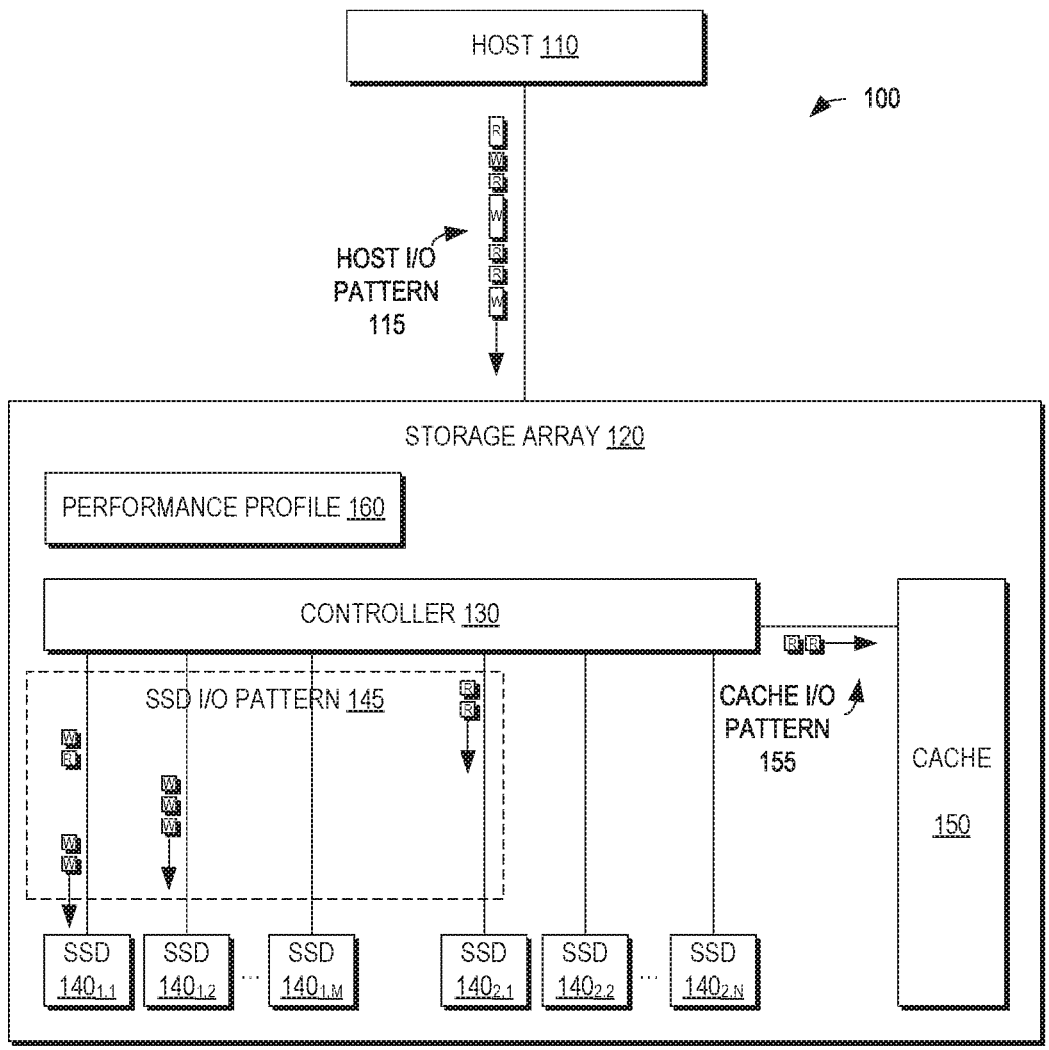
FIG. 1 is a block diagram illustrating a system including a host and a storage array having a plurality of storage devices according to an example embodiment of the present invention.

In general, solid state drives (SSDs) have unique behavior characteristics and, unlike hard disk drives (HDDs), have no moving parts to consider. As a result of these differences, certain HDD metrics (e.g., rotational latency and seek times) do not apply to SSDs and, therefore, response times are usually measured in microseconds for solid-state instead of in milliseconds as with HDDs. Data storage device vendors have recognized that it is important for end users (i.e., consumers of these storage devices) to understand how these measurements are performed to ensure that the reported results represent a verifiable and sustainable level of performance.

Accordingly, data storage device vendors generally have gone to great lengths to demonstrate product performance. Industry-standard benchmarks and other well-accepted benchmarks are a good means to access competitive comparisons with full disclosure on a vendor's product offering. These benchmarks are usually based on host-based application workload and have strict rules around measurement, independent certification, audit, and reporting. For example, many vendors characterize SSD performance according to known host workloads (e.g., 100% read, 100% write, 70% read/30% write, and 30% read/70% write). Therefore, vendors will guarantee performance results for these workloads—but just the stated performance points and with no performance data in between.

However, one of ordinary skill in the art will appreciate that SSD performance may deviate considerably in the non-rated workload ranges. Therefore, SSD performance ratings based on such limited host workloads are not necessarily indicative of SSD performance when connected to a storage array controller and receiving the read/write input/output (I/O) mix the array sends the drive instead of the read/write I/O mix from the host to which the array is connected. In other words, there is no guarantee that the SSD will experience the same I/O mix/pattern behind the storage array controller as the host sent to the storage array. For example, there may be differences in the read/write I/O mix of the storage array, as compared to the read/write I/O mix of the host, because of various operational processes of the storage array (e.g., cache).

As data is written to the SSD, often by multiple applications, the pages are written sequentially throughout the blocks of the flash memory. This new data is replacing old data distributed in other blocks. This causes a potentially large number of small "holes" of invalid pages to become scattered among the pages still containing valid data. Naturally, the need for garbage collection affects an SSD's performance because any write operation to a "full" disk (one whose initial free space or capacity has been filled at least once) needs to await the availability of new free space created through the garbage collection process.

Garbage collection occurs at the block level and, therefore, there is a significant performance difference depending on whether sequential or random data is involved. Sequential files fill entire blocks which dramatically simplifies garbage collection. In contrast, for random data, during garbage collection these blocks of valid data must be moved (i.e., read and re-written) to a different block. The need to move data during garbage collection causes the amount of data being physically written to the SSD to be a multiple of the logical data being written. This phenomenon is expressed as a simple ratio called "write amplification" which approaches 1.0 for sequential writes (i.e., where very little data needs to be moved), but is considerably higher (e.g., 3.0 or more) with randomly written data.

Accordingly, with certain workload mixes as introduced by the normal functionality of the storage array, drive behavior may become unpredictable due to internal drive operations, resulting in significant impact of both read and write performance. Such unpredictable performance is known as performance jitter which degrades the storage array functionality by reducing the array manufacturer's ability to predict the drive performance.

Example embodiments of the present invention predict the occurrence of jitter for a storage device and avoid it in the processing of I/Os from a host at a storage array having a plurality of storage devices (e.g., SSDs, Enterprise Flash Drives (EFDs)). Example embodiments include a statistical methodology to determine an I/O mix threshold at which an unpredictable performance state (i.e., jitter) is likely to occur and avoid it by adjusting performance of the storage array. Accordingly, example embodiments of the present invention will allow storage array manufacturers to identify read/write I/O mixes to the drive that will cause performance jitter (e.g., jitter starts at 100 MBpS, 70/30% R/W) and enable the storage array to take action before jitter starts and to avoid it. As will be described in greater detail below, the methodology includes (1) building a test to characterize the SSD; and (2) determining how much I/O (i.e., in different patterns) can be sent to the storage device before it enters the jitter state.

FIG. 1 is a block diagram illustrating a system 100 including a host 110 and a storage array 120 having a plurality of storage devices $140_{1,1-M}$, having a first type and a plurality of storage device $140_{2,1-N}$ having a second type (140 generally) according to an example embodiment of the present invention. As illustrated in FIG. 1, the host 110 may receive a plurality of I/Os in a host I/O pattern 115 to the storage array 120. Accordingly, the storage array 120 may then receive the I/Os for processing, such as via a storage array controller 130. The controller, at a front end, provides host connectivity and, at a back end, provides connectivity to a plurality of SSDs 140.

The host I/O pattern 115 may include both read and write I/Os of varying size (as represented by the different size boxes representing each individual read and write I/O). As understood in the art, storage arrays typically store data in a constant block size (e.g, 128K for Symmetrix® storage arrays and 8K for XtremIO® storage arrays by EMC Corporation of Hopkinton, Mass.) with the storage array issuing a varying number of I/Os to process data requests rather than varying the sizes of I/Os. Therefore, as a result of processing the I/Os, as described above, the storage array controller 130 may issue a plurality of I/Os in an SSD I/O pattern 145 (or, alternatively, depending on whether the data is stored in a cache 150, a cache I/O pattern 155) having the same size such that the I/O pattern received as a storage device 145 differs greatly than the host I/O pattern 115.

Figure 2:
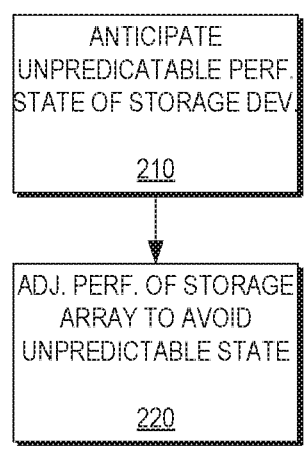
FIG. 2 is a flow diagram illustrating a method for anticipating and avoiding an unpredictable performance state of a storage device in a storage array according to an example embodiment of the present invention.

FIG. 2 is a flow diagram illustrating a method for anticipating and avoiding an unpredictable performance state of a storage device in a storage array according to an example embodiment of the present invention. As illustrated in FIG. 2, with reference to FIG. 1, the storage array controller 130 may anticipate an unpredictable performance state of a storage device 140 in the storage array 120 that degrades storage array functionality according to a performance profile 160 for a storage device type of the storage device 140 (210). In response, the storage array controller 130 may adjust performance of the storage array 120 to avoid the storage device entering the unpredictable performance state (220). The performance profile 160 will be described in greater detail below with reference to FIGS. 4 and 5.

Figure 3:
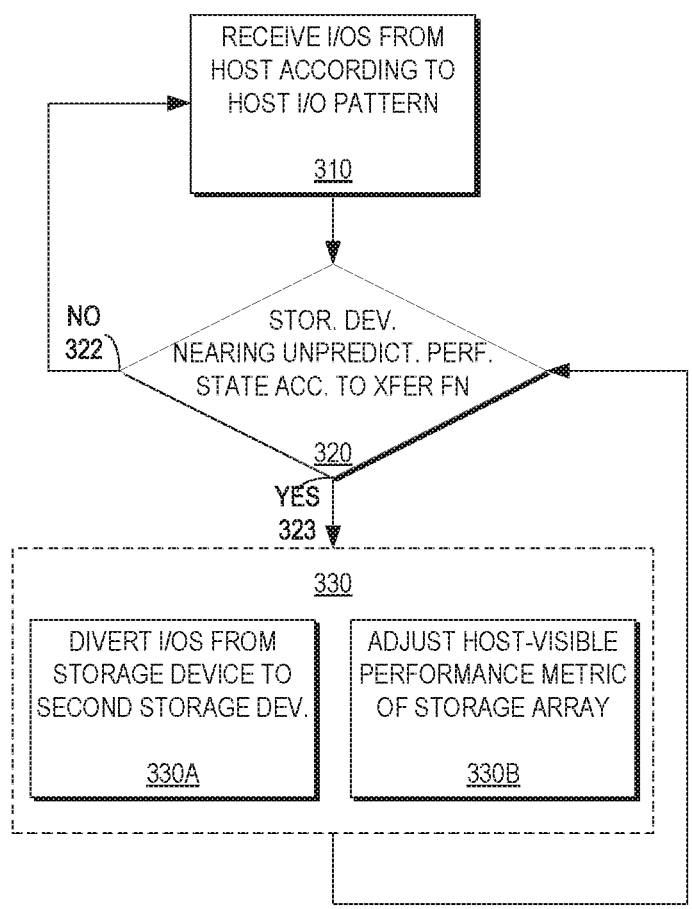
FIG. 3 is a flow diagram illustrating a plurality of methods for avoiding an unpredictable performance state of a storage device in a storage array according to an example embodiment of the present invention.

FIG. 3 is a flow diagram illustrating a plurality of methods for avoiding an unpredictable performance state of a storage device in a storage array according to an example embodiment of the present invention. As illustrated in FIG. 3, the storage array 120 may receive I/Os from the host 110 according to a host I/O pattern (310). The storage controller 130 then may determine whether the storage device 140 is nearing an unpredictable performance state according to a transfer function (320). In other words, the storage array controller 130 may proactively adjust I/O patterns of the storage array 120 to avoid the unpredictable performance state rather than adjust I/O patterns in response to the unpredictable performance state.

The transfer function, as described below, may be part of the performance profile and may be generated according to empirical testing data (i.e., performance metrics) generated by subjecting a test storage device having the same storage device type to an I/O workload pattern typically experienced by a storage array 120 (as opposed to a storage device 140 receiving I/Os directly from a host or other computer).

If the storage device 140 is not nearing the unpredictable performance state (as determined by the transfer function) (322) the storage array 120 may continue to receive I/Os from the host 110 according to the host I/O pattern 115. However, if the storage device 140 is statistically nearing the unpredictable performance state (as determined by the transfer function) (323), the storage array controller 130 may take action to avoid or prevent the storage device 140 from entering the unpredictable performance state (330).

For example, in some embodiments, the storage array controller 130 may divert I/Os from the storage device (e.g., one of storage device $140_{1,1-M}$) to a second storage device of a second type (e.g., one of storage device $140_{2,1-N}$) (330A). It should be understood that different grades of SSDs vary according to capability and cost. In other words, a more expensive SSD typically will have, for example, better hardware, more internal memory, and/or a better CPU and, therefore, should be better able to handle the I/O pattern without entering the unpredictable performance state.

In certain embodiments, diverting I/Os to a second storage device type (330A) causes the second storage device type to function as a buffer and allow the storage device 140 of the first type to, for example, complete its internal transfers that were causing it to approach the unpredictable performance state (i.e., jitter).

In other embodiments, the storage array controller 130 may adjust a host-visible performance metric of the storage array 120 (330B). For instance, the storage array controller 130 may adjust the host-visible performance of the storage array 120 to match the capabilities of the storage device 140 approaching the unpredictable performance state. It should be understood that, while this may cause the performance of the storage array 120 to become inconsistent, it may be beneficial to affect performance of the storage array 120 (e.g., queue a host write I/O and not send it to the storage device 140) if processing the I/O normally would send the storage device 140 into jitter. Accordingly, such a delay may allow the storage device 140 to achieve a more predictable performance so that the host write I/O may be processed without negative effects on performance of the storage device 140.

Figure 4:
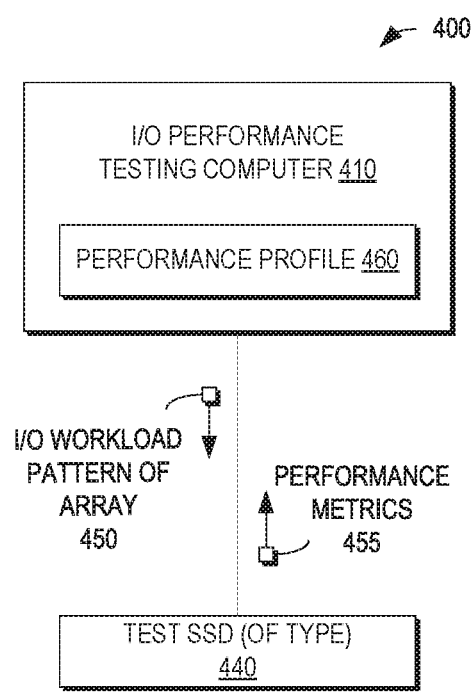
FIG. 4 is a block diagram illustrating a system for developing a performance profile for a storage device type according to an example embodiment of the present invention.
Figure 5:
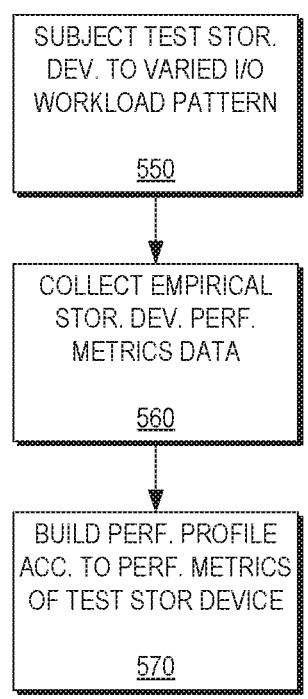
FIG. 5 is a flow diagram illustrating a method for developing a performance profile for a storage device type according to an example embodiment of the present invention.

FIG. 4 is a block diagram illustrating a system 400, and FIG. 5 is a flow diagram illustrating a method, for developing a performance profile for a storage device type 440 according to respective example embodiments of the present invention. FIGS. 4 and 5 may be described in conjunction.

As illustrated in FIG. 4, the system 400 includes an I/O performance testing computer 410 configured to test an I/O workload pattern 450 on a test SSD 440 having a desired type of testing to develop a performance profile 460 for the SSD type. Accordingly, the I/O performance testing computer 410 may subject the test storage device 440 to a varied I/O workload pattern (550). Empirical performance metrics 455 for the test storage device 440 (e.g., drive I/O latency) may be collected (560) and used by the I/O performance testing computer 410 to build the performance profile 460 of the test storage device 440 (570).

Example embodiments of the present invention may use statistical tools in building the performance profile 460. For example, the I/O performance testing computer 410 may apply Design of Experiments (DOE) methodologies to the performance metrics 455 collected from the test SSD 440 (i.e., empirical data) to develop a transfer function describing read/write ratios that lead to jitter. Design of Experiments is described in greater detail in H. Guo and A. Mettas, *Design of Experiments and Data Analysis,* "2010 Reliability and Maintainability Symposium," San Jose, Calif., USA, Jan. 25-28, 2010, incorporated by reference herein in its entirety.

For example, the I/O performance testing computer 410 may subject the test storage device 440 to I/O workload patterns with multiple test variables (e.g., transfer function inputs) such as I/Os per second (IOPs) to the test storage device 440, read/write I/O mix, I/O block size, time-length of I/O workload, etc. Accordingly, the output of the transfer function will be a test storage device I/O latency for a particular set of inputs such that the transfer function provides a statistical test to determine whether a storage device 140 of the test storage device type 440 is nearing a jitter threshold.

Accordingly, in an application in a storage array (e.g., storage array 120 of FIG. 1), example embodiments of the present invention may avoid performance degradation resulting from jitter by modifying I/O patterns from the storage array 120 to the SSD 140 to keep drive latency below a threshold set by the transfer function for a particular read/write ratio of I/Os. In other words, as described above with reference to FIG. 1, the storage array controller 130 may affect performance of the storage array 120 (i.e., modify I/O patterns from the storage array 120 to the SSD 140) according to the performance profile 460 for the type of SSD 440 generated according to the empirical performance metrics 455 collected by the I/O performance testing computer 410.

Figure 6:
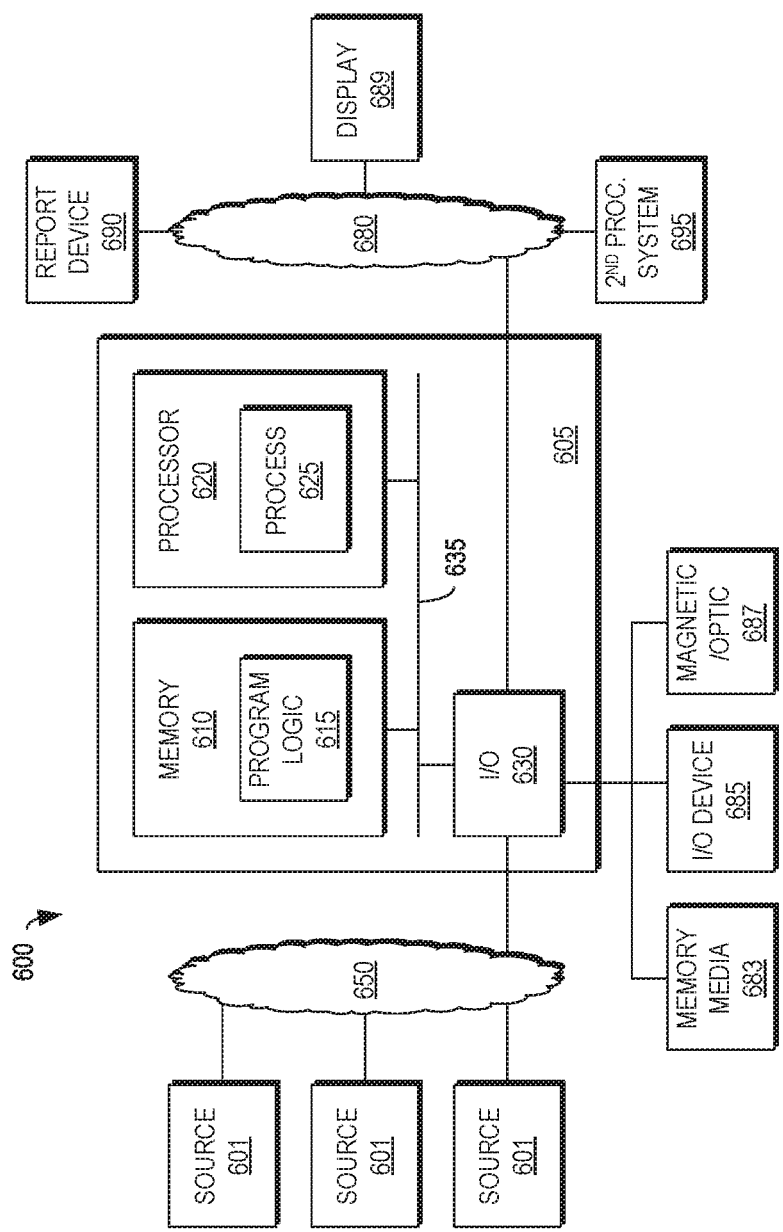
FIG. 6 is a block diagram illustrating an apparatus according to an example embodiment of the present invention.

FIG. 6 is a block diagram of an example embodiment apparatus 605 according to the present invention. The apparatus 605 may be part of a system 600 and includes memory 610 storing program logic 615, a processor 620 for executing a process 625, and a communications I/O interface 630, connected via a bus 635. The apparatus 605 is configured to communicate with memory media 683, I/O devices 685, and magnetic or optical (magnetic/optic) drives 687 via the communications I/O interface 630. The apparatus 605 is configured to communicate with a plurality of sources 601 via a network 650 using communications I/O interface 630. The apparatus 605 is further configured to communicate with a display 689, a report device 690, and a second processing system 695 via a network 680 using communications I/O interface 630. The exemplary apparatus 605 is discussed only for illustrative purpose and should not be construed as a limitation on the embodiments or scope of the present disclosure. In some cases, some devices may be added to or removed from a computer system based on specific situations. For example, a computer system may be representative of a standalone system or a system of a production site, which comprises a number of hosts coupled to a source disk and a target disk. In most embodiments, a system/device may comprise a processor and a memory, such as a laptop computer, personal digital assistant, or mobile phones.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

In some embodiments, the system may be performed by one or more programmable processors executing one or more computer programs to perform the functions of the system. In some other embodiments, all or part of the system may be implemented as special purpose logic circuitry (e.g., a field-programmable gate array (FPGA) and/or an application-specific integrated circuit (ASIC)). In some other embodiments, all or part of the system may be implemented using electronic hardware circuitry that include electronic devices such as, for example, at least one of a processor, a memory, a programmable logic device or a logic gate.

In one embodiment, the methods described herein are not limited to the specific examples described. In a further embodiment, rather, any of the method steps may be re-ordered, combined or removed, or performed in parallel or in serial, as necessary, to achieve the results set forth above.

In some embodiments, the system may be implemented, at least in part, via a computer program product, (e.g., in a non-transitory machine-readable storage medium such as, for example, a non-transitory computer-readable medium), for execution by, or to control the operation of, a data processing apparatus (e.g., a programmable processor, a computer, or multiple computers). In certain embodiments, each such program may be implemented in a high level procedural or object-oriented programming language to communicate with a computer system. In certain other embodiments, however, the programs may be implemented in assembly or machine language. In some embodiments, the language may be a compiled or an interpreted language and it may be deployed in any form, including as a stand-alone program or as a module, component, subroutine, or other unit suitable for use in a computing environment. In some other embodiments, a computer program may be deployed to be executed on one computer or on multiple computers at one site or distributed across multiple sites and interconnected by a communication network.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 6, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine. In some other embodiment, a non-transitory machine-readable medium may include but is not limited to a hard drive, compact disc, flash memory, non-volatile memory, volatile memory, magnetic diskette and so forth but does not include a transitory signal per se.

Figure 7:
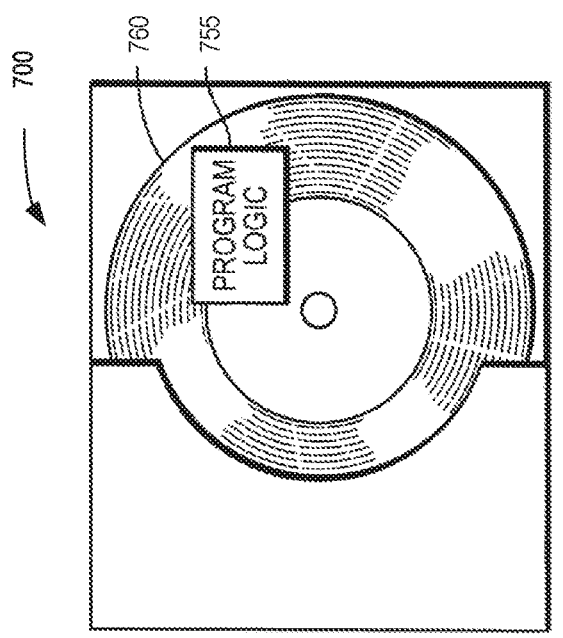
FIG. 7 is a block diagram illustrating of an example embodiment of the present invention as embodied in computer program code.

FIG. 7 is a block diagram of a computer program product 700 including program logic 755, encoded on a computer-readable medium 760 in computer-executable code configured for carrying out the methods of the invention, according to an example embodiment of the present invention. The logic for carrying out the method may be embodied as part of the aforementioned system, which is useful for carrying out a method described with reference to embodiments shown. In one embodiment, program logic 755 may be loaded into memory and executed by a processor. In a further embodiment, program logic 755 may also be the same program logic 755 on a computer readable medium.

Various exemplary embodiments of the present disclosure have been described with reference to the accompanying drawings. It should be noted that all of these drawings and descriptions are only presented as exemplary embodiments. It is to be noted that based on the subsequent description, alternative embodiments may be conceived that may have a structure and method disclosed as herein, and such alternative embodiments may be used without departing from the principle of the disclosure as claimed in the present disclosure.

It may be appreciated that these exemplary embodiments are provided only for enabling those skilled in the art to better understand and then further implement the present disclosure, not intended to limit the scope of the present disclosure in any manner. Besides, in the drawings, for a purpose of illustration, optional steps, modules, and units are illustrated in dotted-line blocks.

The terms "comprise(s)," "include(s)", their derivatives and like expressions used herein should be understood to be open, i.e., "comprising/including, but not limited to". The term "based on" means "at least in part based on". The term "one embodiment" means "at least one embodiment"; and the term "another embodiment" indicates "at least one further embodiment". Reference to a "computer" may be a physical computer or a virtual computer (i.e., virtual machine). Relevant definitions of other terms have been provided in this description.

It may be noted that the flowcharts and block diagrams in the figures may illustrate the apparatus, method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method for preventing performance degradation of a storage device comprising:
   anticipating, by a storage device controller, an unpredictable performance state of a storage device in a storage array that degrades storage array functionality according to a performance profile for a storage device type of the storage device, the unpredictable performance state being a state in which internal drive operations of the storage device cause performance of the storage device to become unpredictable, wherein:
      the anticipating includes determining that the storage device is statistically nearing an unpredictable performance state threshold according to a transfer function built as part of the performance profile for the storage device type of the storage device;
      the performance profile for the storage device type is developed according to varied input/output (I/O) workloads and consistent with performance of the storage device type when included in a storage array;
      the developing of the performance profile comprises subjecting a test storage device having the storage device type to varied I/O workload patterns of a storage array, the test storage device being different than the storage device;

wherein subjecting the test storage device having the storage device type to varied I/O workload patterns of a storage array comprises simulating an I/O workload pattern of a storage array that comprises a plurality of constant size I/Os and is consistent with I/O workload patterns experienced by storage devices included in a storage array, the I/O workload patterns experienced by the storage devices included in a storage array being different than I/O workload patterns received by a storage array from a host, the I/O workload patterns received by a storage array from a host comprising I/Os having varied sizes; and adjusting, by a storage device controller, performance of the storage array to avoid the storage device entering the unpredictable performance state.

2. The method of claim 1 wherein adjusting performance of the storage array to avoid the storage device entering the unpredictable performance state comprises diverting I/Os from the storage device to a second storage device at times the storage device is statistically nearing the unpredictable performance state threshold.

3. The method of claim 1 wherein adjusting performance of the storage array to avoid the storage device entering the unpredictable performance state comprises adjusting a host-visible performance metric of the storage array to match performance capabilities of the storage device.

4. The method of claim 3 wherein adjusting a host-visible performance metric of the storage array to match performance capabilities of the storage device comprises adjusting I/O patterns of the storage array to avoid the storage device entering the unpredictable performance state.

5. The method of claim 1 wherein the developing of the performance profile further comprises:
   collecting empirical test storage device performance metrics data; and
   building a transfer function illustrative of performance metrics of the test storage device according to the collected empirical data.

6. The method of claim 1 wherein subjecting the test storage device having the storage device type to varied I/O workload patterns of a storage array further comprises subjecting the test storage device to a plurality of I/O workload patterns respectively varying according to at least one of IOPs, read-write ratio, block size, time-length of workload, and storage device type.

7. The method of claim 1 wherein the internal drive operations are garbage collection processes of the storage device and the unpredictable performance state is a jitter state caused by the garbage collection processes of the storage device.

8. A system for preventing performance degradation of a storage device comprising:
   a storage array having a storage device of a device type;
   one or more processors; and
   computer program code that, when executed on the one or more processors, causes the system to detect and avoid storage array performance degradation by performing the operations of:
      anticipating an unpredictable performance state of a storage device in a storage array that degrades storage array functionality according to a performance profile for a storage device type of the storage device, the unpredictable performance state being a state in which internal drive operations of the storage device cause performance of the storage device to become unpredictable, wherein:
         the anticipating includes determining that the storage device is statistically nearing an unpredictable performance state threshold according to a transfer function built as part of the performance profile for the storage device type of the storage device;
         the performance profile for the storage device type is developed according to varied input/output (I/O) workloads and consistent with performance of the storage device type when included in a storage array;
         the developing of the performance profile comprises subjecting a test storage device having the storage device type to varied I/O workload patterns of a storage array, the test storage device being different than the storage device;
         wherein subjecting the test storage device having the storage device type to varied I/O workload patterns of a storage array comprises simulating an I/O workload pattern of a storage array that comprises a plurality of constant size I/Os and is consistent with I/O workload patterns experienced by storage devices included in a storage array, the I/O workload patterns experienced by the storage devices included in a storage array being different than I/O workload patterns received by a storage array from a host, the I/O workload patterns received by a storage array from a host comprising I/Os having varied sizes; and
      adjusting performance of the storage array to avoid the storage device entering the unpredictable performance state.

9. The system of claim 8 wherein adjusting performance of the storage array to avoid the storage device entering the unpredictable performance state comprises diverting I/Os from the storage device to a second storage device at times the storage device is statistically nearing the unpredictable performance state threshold.

10. The system of claim 8 wherein adjusting performance of the storage array to avoid the storage device entering the unpredictable performance state comprises adjusting a host-visible performance metric of the storage array to match performance capabilities of the storage device.

11. The system of claim 10 wherein adjusting a host-visible performance metric of the storage array to match performance capabilities of the storage device comprises adjusting I/O patterns of the storage array to avoid the storage device entering the unpredictable performance state.

12. The system of claim 8 wherein the developing of the performance profile further comprises:
   collecting empirical test storage device performance metrics data; and
   building a transfer function illustrative of performance metrics of the test storage device according to the collected empirical data.

13. The system of claim 8 wherein subjecting the test storage device having the storage device type to varied I/O workload patterns of a storage array further comprises subjecting the test storage device to a plurality of I/O workload patterns respectively varying according to at least one of IOPs, read-write ratio, block size, time-length of workload, and storage device type.

14. The system of claim 8 wherein the internal drive operations are garbage collection processes of the storage device and the unpredictable performance state is a jitter state caused by the garbage collection processes of the storage device.

15. A computer program product including a non-transitory computer readable storage medium having computer program code encoded thereon that when executed on a processor of a computer causes the computer to detect and avoid storage array performance degradation, comprising:

computer program code for anticipating an unpredictable performance state of a storage device in a storage array that degrades storage array functionality according to a performance profile for a storage device type of the storage device, the unpredictable performance state being a state in which internal drive operations of the storage device cause performance of the storage device to become unpredictable, wherein:

the anticipating includes determining that the storage device is statistically nearing an unpredictable performance state threshold according to a transfer function built as part of the performance profile for the storage device type of the storage device;

the performance profile for the storage device type is developed according to varied input/output (I/O) workloads and consistent with performance of the storage device type when included in a storage array;

the developing of the performance profile comprises subjecting a test storage device having the storage device type to varied I/O workload patterns of a storage array, the test storage device being different than the storage device;

wherein subjecting the test storage device having the storage device type to varied I/O workload patterns of a storage array comprises simulating an I/O workload pattern of a storage array that comprises a plurality of constant size I/Os and is consistent with I/O workload patterns experienced by storage devices included in a storage array, the I/O workload patterns experienced by the storage devices included in a storage array being different than I/O workload patterns received by a storage array from a host, the I/O workload patterns received by a storage array from a host comprising I/Os having varied sizes; and computer program code for adjusting performance of the storage array to avoid the storage device entering the unpredictable performance state.

16. The computer program product of claim 15, wherein the developing of the performance profile further comprises:
collecting empirical test storage device performance metrics data; and
building a transfer function illustrative of performance metrics of the test storage device according to the collected empirical data.

17. The computer program product of claim 15 wherein the internal drive operations are garbage collection processes of the storage device and the unpredictable performance state is a jitter state caused by the garbage collection processes of the storage device.

18. The computer program product of claim 15 wherein adjusting performance of the storage array to avoid the storage device entering the unpredictable performance state comprises diverting I/Os from the storage device to a second storage device at times the storage device is statistically nearing the unpredictable performance state threshold.

19. The computer program product of claim 15 wherein adjusting performance of the storage array to avoid the storage device entering the unpredictable performance state comprises adjusting a host-visible performance metric of the storage array to match performance capabilities of the storage device.

20. The computer program product of claim 19 wherein adjusting a host-visible performance metric of the storage array to match performance capabilities of the storage device comprises adjusting I/O patterns of the storage array to avoid the storage device entering the unpredictable performance state.

21. The computer program product of claim 15 wherein subjecting the test storage device having the storage device type to varied I/O workload patterns of a storage array further comprises subjecting the test storage device to a plurality of I/O workload patterns respectively varying according to at least one of IOPs, read-write ratio, block size, time-length of workload, and storage device type.

* * * * *

UNITED STATES PATENT AND TRADEMARK OFFICE
CERTIFICATE OF CORRECTION

PATENT NO. : 10,545,674 B1  
APPLICATION NO. : 15/198406  
DATED : January 28, 2020  
INVENTOR(S) : Felix Shvaiger et al.

Page 1 of 1

It is certified that error appears in the above-identified patent and that said Letters Patent is hereby corrected as shown below:

On the Title Page

Assignee: please delete "EMS EP Holding Company LLC" and insert therefor --EMC IP Holding Company LLC--

Signed and Sealed this  
Third Day of March, 2020

Andrei Iancu  
*Director of the United States Patent and Trademark Office*